June 4, 1946.                    C. W. WOOD                         2,401,598
                           SECTIONAL ENCLOSING CASING
                              Filed June 27, 1944
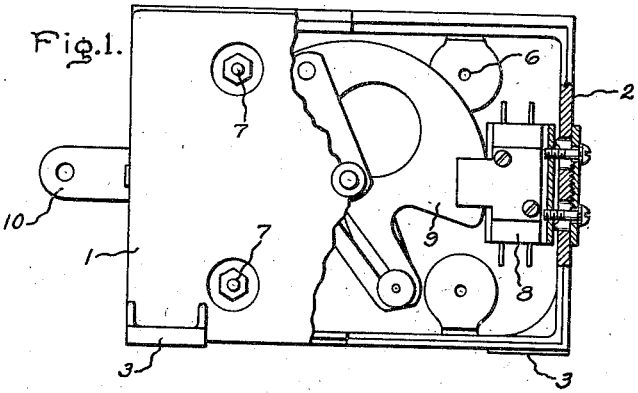
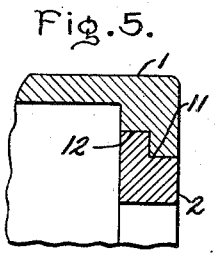
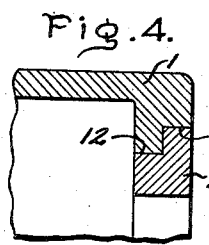
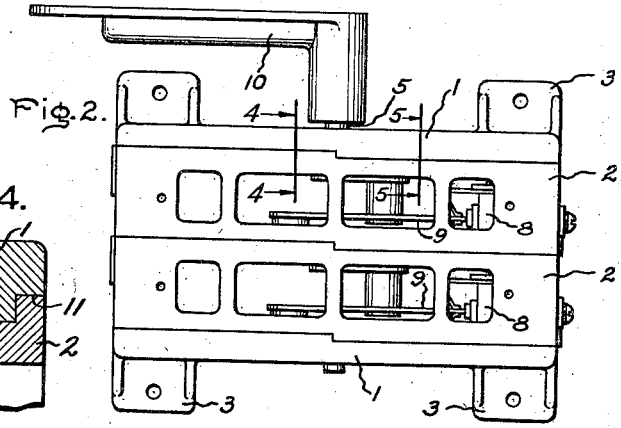
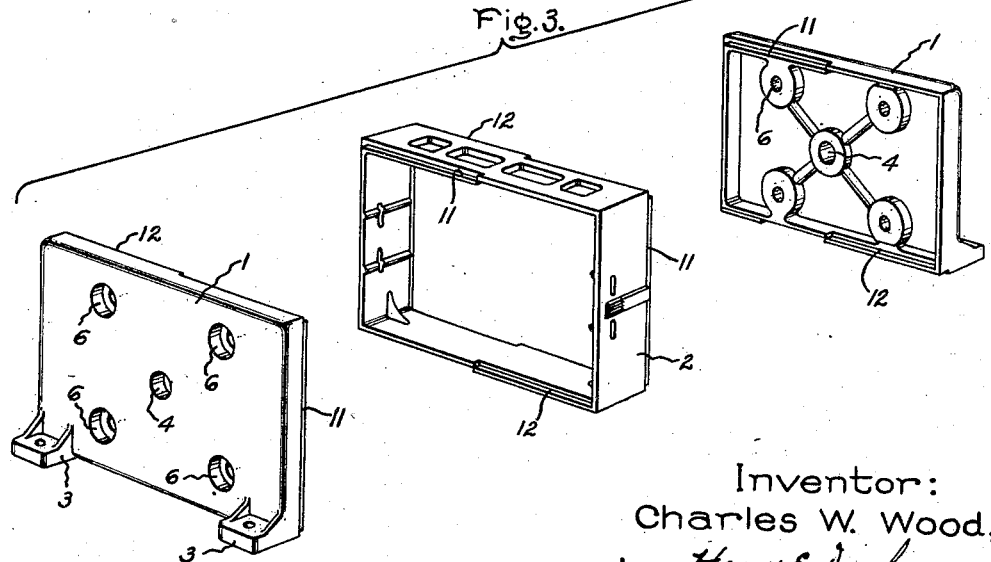
Inventor:
Charles W. Wood,
by *Harry E. Dunham*

Patented June 4, 1946

2,401,598

UNITED STATES PATENT OFFICE 2,401,598

SECTIONAL ENCLOSING CASING

Charles W. Wood, Schenectady, N. Y., assignor to General Electric Company, a corporation of New York Application June 27, 1944, Serial No. 542,410

7 Claims. (Cl. 220—4)

My invention relates to sectional enclosing casings, and more particularly to sectional casings for electric apparatus, such as switches and the like.

It is a general object of my invention to provide a new and improved sectional enclosing casing having a minimum number of interchangeable and reversible parts.

It is another object of my invention to provide a flanged sectional enclosing casing having identical interchangeable end plates and reversible and interchangeable intermediate sections.

My invention itself will be more fully understood and its objects and advantages further appreciated by referring now to the following detailed specification taken in conjunction with the accompanying drawing, in which Fig. 1 is a side elevation, partly in section, of a multi-section electric switch embodying my invention; Fig. 2 is a plan view of the switch of Fig. 1; Fig. 3 is an exploded perspective view of certain of the casing sections; and Figs. 4 and 5 are fragmentary sectional views taken along the lines 4—4 and 5—5, respectively, of Fig. 2.

Referring now to the drawing, I have shown my invention applied to a sectional casing for a multi-section electric limit switch. Each intermediate section of the casing contains a separate cam-actuated electric limit switch and the complete assembly may include any desired number of switches actuated by a common operating member. The switch casing itself comprises a plurality of interfitting sections including a pair of identical end plates 1 and a plurality of identical intermediate sections 2. The end plates 1 are provided with mounting bosses 3 along one side thereof to determine a base for the switch casing unit. The end plates 1 are bored at 4 to receive a rotatable operating shaft 5, and are provided with a plurality of bolt holes 6 through which bolts 7 are passed to hold the sections of the casing together.

By way of illustration of a useful application of my invention, I have shown each intermediate casing section provided with an electric switch 8 and a suitable switch actuating mechanism 9. Each switch 8 is mounted upon a side wall of an intermediate casing section. Each switch actuating mechanism 9 includes a rotatable cam for actuating the switch. The various operating mechanisms in a bank of sections are arranged to be operated in unison by a common operating handle 10 attached to the operating shaft 5.

The sections of the switch casing are mounted in end-to-end relation with their peripheral edges in engagement, as shown in the drawing. In order to provide for reversibility and interchangeability of the end sections and any of the intermediate sections, each peripheral edge of each casing section is rabbeted externally, as at 11, for a portion of its periphery and internally, as at 12, for another portion of its periphery. In the illustrative embodiment of the invention shown in the drawing, each external rabbet 11 extends around one-half of each peripheral edge and each internal rabbet 12 extends around the other half of each peripheral edge. I provide interchangeability of the end sections 1 and reversibility of the intermediate sections 2 by arranging the internal and external rabbets on opposite peripheral edges of each intermediate section so that the external rabbet 11 along one portion of one peripheral edge lies opposite the internal rabbet 12 along the like portion of the opposite external peripheral edge. The internal and external rabbets are interfitting as shown at Figs. 4 and 5.

In the particular embodiment of the invention shown, the line of division between the internal and external rabbets at the edge of any casing section lies along a line perpendicular to the base of the casing as determined by the mounting bosses 3. Such symmetrical division of the internally and externally rabbeted portions of the casing section ensures that the bases of the end sections 1 remain on the same side of the casing when the sections are interchanged and permits reversibility of the intermediate sections. It will be evident that in interchanging the end sections or in reversing an intermediate section, each section must be rotated about the line of division perpendicular to the base side.

While I have shown and described only a preferred embodiment of my invention by way of illustration, many modifications will occur to those skilled in the art and I therefore wish to have it understood that I intend in the appended claims to cover all such modifications as fall within the true spirit and scope of my invention.

What I claim as new and desire to secure by Letters Patent of the United States, is:

1. An enclosing casing comprising a pair of identical end sections each internally rabbeted about one portion of its periphery and externally rabbeted about a second portion thereof, and an open-ended intermediate section similarly rabbeted internally and externally about each peripheral edge thereof, like peripheral portions of opposite edges of said intermediate section being oppositely rabbeted thereby to permit assembly of said sections in interfitting relation.

2. An enclosing casing comprising a pair of identical end sections each internally rabbeted about one portion of its periphery and externally rabbeted about a second portion thereof, and an open-ended intermediate section similarly rabbeted internally and externally about each peripheral edge thereof, the rabbeted portions of each edge of each said section being symmetrically positioned with respect to a common median plane and like portions of opposite edges of said intermediate section being oppositely rabbeted, whereby said sections may be interchangeably and reversibly assembled with said rabbeted portions in interfitting relation.

3. An enclosing casing comprising a pair of identical end sections each internally rabbeted about one half of its periphery and externally rabbeted about the other half of its periphery, and an open-ended intermediate section similarly rabbeted internally and externally about adjacent halves at each peripheral edge, like halves of opposite peripheral edges of said intermediate section being oppositely rabbeted so that said sections may be interchangeably assembled in interfitting peripheral engagement.

4. A sectional enclosing casing comprising a pair of identical end sections each internally rabbeted about one portion of its periphery and externally rabbeted about a second portion thereof, and a plurality of open-ended intermediate sections similarly rabbeted internally and externally about each peripheral edge thereof, similar peripheral portions of opposite edges of each of said intermediate sections being oppositely rabbeted thereby to permit said sections to be interchangeably assembled in peripheral engagement with said rabbeted portions in interfitting relation.

5. A sectional switch casing comprising a pair of identical end sections each having a mounting boss determining a base side and being internally rabbeted about one half its periphery and externally rabbeted about the other half thereof, said peripheral halves being divided by a plane perpendicular to said base side, and a plurality of open-ended intermediate sections in end-to-end peripheral engagement with each other and with said end sections and being similarly rabbeted internally and externally about adjacent halves of each peripheral edge thereof, similar peripheral halves of opposite edges of said intermediate sections being oppositely rabbeted, whereby said sections may be interchangeably and reversibly assembled with said rabbeted edges in interfitting relation.

6. An enclosing casing comprising a pair of identical end sections each internally rabbeted about one half of its periphery and externally rabbeted about the other half of its periphery.

7. An enclosing casing comprising a pair of identical end sections each internally rabbeted about one half of its peripheral edge and externally rabbeted about the other half of its peripheral edge, said halves being of symmetrical configuration and divided by a plane perpendicular to the plane of said peripheral edge.

CHARLES W. WOOD.